(12) United States Patent
Curtis et al.

(10) Patent No.: US 8,829,094 B2
(45) Date of Patent: Sep. 9, 2014

(54) USE OF NUCLEATION IN ICP RESINS

(71) Applicant: Fina Technology, Inc., Houston, TX (US)

(72) Inventors: Ruby L. Curtis, League City, TX (US); Mark Leland, Houston, TX (US); John Ashbaugh, Houston, TX (US); Jay Nguyen, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/676,911

(22) Filed: Nov. 14, 2012

(65) Prior Publication Data

US 2013/0165571 A1   Jun. 27, 2013

Related U.S. Application Data

(60) Provisional application No. 61/578,978, filed on Dec. 22, 2011.

(51) Int. Cl.
*C08K 5/053* (2006.01)

(52) U.S. Cl.
USPC .......................... 524/387; 524/451; 524/396

(58) Field of Classification Search
CPC ....................................................... C08K 5/053
USPC ........... 428/516; 525/240; 526/351; 524/387, 524/451, 396
See application file for complete search history.

(56) References Cited

U.S. PATENT DOCUMENTS

| | | | | |
|---|---|---|---|---|
| 6,005,034 | A * | 12/1999 | Hayashida et al. | 524/117 |
| 8,580,893 | B2 * | 11/2013 | McLeod et al. | 525/192 |
| 2005/0234172 | A1 * | 10/2005 | Musgrave et al. | 524/379 |
| 2006/0189763 | A1 * | 8/2006 | Yang et al. | 525/240 |
| 2007/0040292 | A1 * | 2/2007 | Ashbaugh et al. | 264/40.1 |
| 2007/0054997 | A1 * | 3/2007 | Pierini et al. | 524/109 |
| 2009/0029182 | A1 * | 1/2009 | Aubee et al. | 428/476.9 |
| 2010/0260995 | A1 * | 10/2010 | Pellegatti et al. | 428/220 |

\* cited by examiner

*Primary Examiner* — Michael M Bernshteyn

(57) ABSTRACT

A blown film composition including an impact copolymer polypropylene component and a nucleating agent, wherein the blown film has improved processing and physical properties.

25 Claims, 2 Drawing Sheets

USE OF NUCLEATION IN ICP RESINS

CROSS-REFERENCE TO RELATED APPLICATIONS

Not applicable.

FIELD

The present disclosure is generally related to polyolefins and methods of making polyolefins. More specifically, the present disclosure is related to methods of making impact copolymer (ICP) resins.

BACKGROUND

A polyolefin is a polymer produced from a simple olefin monomer, or alkene with the general formula $C_nH_{2n}$. An example of a polyolefin is polypropylene (PP), which is produced by polymerizing the olefin propylene. One type of polyolefin is an impact copolymer polypropylene (ICP) that is an ethylene/propylene rubber impact-modified heterophasic copolymer. Polyolefins may be used in blown films. ICP blown films may include films having improved physical properties, such as high impact strength as compared to other films. Multiple challenges exist in producing ICP films. For example, to improve processability the melt flow rate of a resin may be increased, but this may also reduce the resin melt strength and have a negative effect on bubble stability in the blown film process. Reduced bubble stability causes less uniform gauge distribution and can result in reduced throughput, as extrusion rates may need to be lowered to provide better gauge control.

SUMMARY

An embodiment of the present disclosure, either by itself or in combination with other embodiments, is a blown film composition that includes an impact copolymer polypropylene component and a nucleating agent where the blown film composition has improved processing properties as compared to a blown film of the impact copolymer polypropylene component absent the nucleating agent. The blown film composition can have an improvement of bubble stability that can result in a reduction in film gauge variation.

The blown film composition can have a reduction in film gauge variation of greater than 20% as compared to a blown film of the impact copolymer polypropylene component without a nucleating agent, optionally greater than 30%, optionally greater than 40%.

An embodiment of the disclosure can include an article made from the ICP blown film composition.

Other possible embodiments include two or more of the above embodiments of the disclosure. In an embodiment the method includes all of the above embodiments and the various procedures can be carried out in any order.

BRIEF DESCRIPTION OF DRAWINGS

The present disclosure is best understood from the following detailed description when read with the accompanying figures.

DETAILED DESCRIPTION

Figure 1:
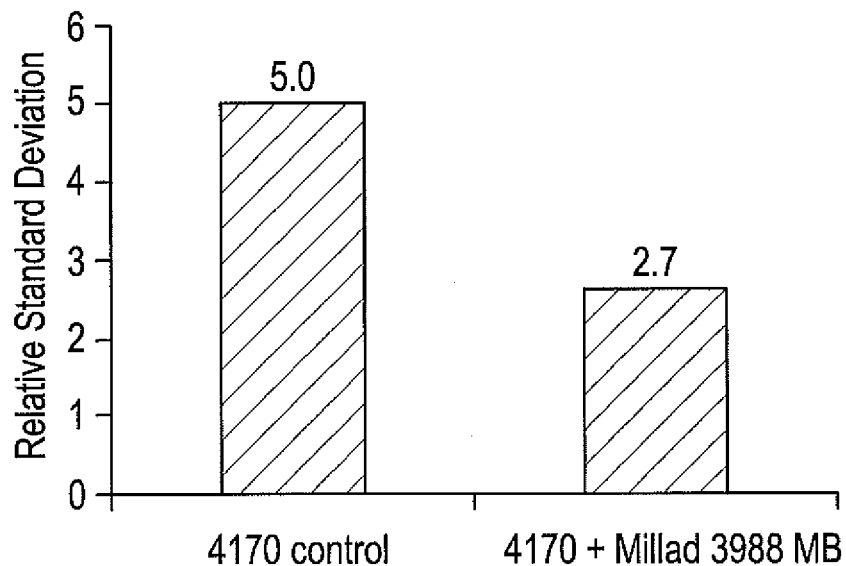
FIG. 1 is a graph of relative standard deviation of gauge thickness of blown films for various ICP formulations.

The following disclosure provides many different embodiments, or examples, for implementing different features of various embodiments. Specific examples of components and arrangements are described below to simplify the present disclosure. These are, of course, merely examples and are not intended to be limiting.

Disclosed herein are methods and blends of nucleated ICP that are effective in blown film processes. Also disclosed herein is a nucleated ICP blend having improved processability in a blown film process and that can have more uniform gauge distribution compared to the ICP blend without nucleation.

A polymeric composition includes at least one polymer and may also include a modifier. In an embodiment, the polymer may include an impact copolymer, for example a polypropylene impact copolymer. Polypropylene impact copolymers are also known as heterophasic copolymers wherein a polypropylene homopolymer phase or component is joined to a copolymer phase or component. The ICP may comprise from 10 wt. % to 20 wt. %, ethylene, alternatively from 10 wt. % to 15 wt. % ethylene, based on the total weight of the ICP. In certain embodiments, the polymeric composition does not include any polymers other than propylene impact copolymers.

The homopolymer phase of an ICP may be a propylene homopolymer, provided however that the homopolymer phase may contain up to 5% by weight of another alpha-olefin, including but not limited to $C_2$-$C_8$ alpha-olefins such as ethylene and 1-butene. Despite the potential presence of small amounts of other alpha-olefins, this component of the ICP is generally referred to as a polypropylene homopolymer.

The copolymer phase of an ICP may be a random copolymer of propylene and ethylene, also referred to as an ethylene/propylene rubber (EPR). Without wishing to be limited by theory, it is thought by some that the EPR portion of the ICP has rubbery characteristics which, when incorporated within the matrix of the homopolymer component, may function to provide increased impact strength to the ICP. Small amounts of other polymerizable monomers may be included with the propylene and ethylene so as to impart desired physical properties.

In an embodiment, the ICP may have a melt flow rate of less than 4.0 g/10 min., alternatively of less than 2.0 g/10 min., alternatively of less than 1.0 g/10 min. A non-limiting example of a suitable ICP is 4170 by Total Petrochemicals USA, Inc.

Broad molecular weight distribution ethylene/propylene rubber impact-modified heterophasic copolymers (ICPs) such as 4170 polypropylene can be advantageously blended with nucleating agents to give blown films having improved properties. Several different blends involving 4170 polypropylene mixed with nucleating agents that improve or change properties including, but not necessarily limited to, improved bubble stability were studied. These studies will help to develop expertise in blown film that will support polyolefin businesses and result in novel blends and film and sheet materials.

The broad molecular weight distribution ethylene/propylene rubber impact-modified heterophasic copolymer that is modified with a nucleating agent may be one having a polydispersity from about 4 to about 12, a melt flow rate from about 0.5 to about 5.0 dg/min, and xylene solubles of 25% or less. Impact copolymers having these characteristics include, but are not necessarily limited to ATOFINA's 4170, 4180, 4280 and 4280W polypropylene. In one non-limiting embodiment of the disclosure, the ICP may have a polydispersity from about 5 to about 10, a melt flow rate from about 0.5 to about 2.5 dg/min, and xylene solubles of 25% or less. In an alternate non-limiting embodiment of the disclosure, the xylene solubles may range from about 10 to 25 wt %, and in another alternative from about 15 to 25 wt %. In another non-limiting embodiment, the impact copolymer may have a melting point ranging from about 155 to about 170° C. and a 1% secant modulus of from about 100 to about 225 kpsi. In an alternate non-limiting embodiment, the impact copolymer may have a melting point ranging from about 158 to about 166° C. and a 1% secant modulus of from about 100 to about 175 kpsi. The density of the impact copolymer may range from about 0.89 to about 0.92 g/cm$^3$ in one non-limiting embodiment, and from about 0.9 to 0.91 g/cm$^3$ in an alternate embodiment. And in still another non-limiting embodiment the ethylene content of the impact copolymer may range from about 7 to about 15 wt %, and alternatively from about 9 to about 14 wt %. Methods for making ICPs are well known in the art, for instance, in one non-limiting embodiment methods and techniques as described in U.S. Pat. No. 6,657,024, incorporated herein by reference, may be used.

The ICP/nucleating agent blends of the present disclosure may also contain various additives capable of imparting specific properties to the articles the blends are intended to produce. Additives known to those skilled in the art that may be used in these blends include, but are not necessarily limited to, fillers such as talc and calcium carbonate, pigments, antioxidants, stabilizers, anti-corrosion agents, slip agents, and antiblock agents, etc.

The catalyst systems that may be useful in polymerizing olefin monomers include any suitable catalyst system. The catalysts used in conjunction with the present disclosure may include for example, chromium based catalyst systems, single site transition metal catalyst systems including metallocene catalyst systems, Ziegler-Natta catalyst systems or combinations thereof. The polymerization catalysts may be activated and may or may not be associated with a support material. The following discussion of such catalyst systems included below is in no way intended to limit the scope of the present disclosure to such catalysts.

Ziegler-Natta catalyst systems may be formed from the combination of a metal component (e.g., a catalyst) with one or more additional components, such as a catalyst support, a cocatalyst and/or one or more electron donors. In some embodiments, the Ziegler-Natta catalyst systems include magnesium-supported catalyst systems. In an embodiment, for example, a magnesium-supported Ziegler-Natta catalyst may be prepared by the steps of: preparing a metal dialkoxide as the reaction product of a metal dialkyl and an alcohol; followed by preparing a soluble catalyst precursor as the reaction product of the metal dialkoxide and a halogenating/titanating agent; and lastly followed by precipitating of a final solid catalyst component as the reaction product of the soluble catalyst precursor and a precipitating agent. The precipitating agent may also be used as a halogenating/titanating agent. The process of preparing the Ziegler-Natta catalyst may include further steps, such as additional halogenating/titanating steps. The metal dialkyls may include Group IIA metal dialkyls. In a specific embodiment, the metal dialkyl is a magnesium dialkyl. The magnesium dialkyl may be selected from the group of diethyl magnesium, dipropyl magnesium, dibutyl magnesium, and butylethyl magnesium (BEM) and combinations thereof.

Metallocenes may include organometallic compounds containing two cyclopentadienyl rings bonded to a metal atom. Metallocene catalysts generally include a transition metal situated between to organic rings. Metallocene catalysts are homogenous (soluble in hydrocarbons), whereas Ziegler-Natta catalysts are heterogeneous. Metallocene catalysts may be characterized as coordination compounds incorporating one or more cyclopentadienyl (Cp) groups (which may be substituted or unsubstituted, each substitution being the same or different) coordinated with a transition metal through π bonding. The substituent groups on the Cp groups may be linear, branched or cyclic hydrocarbyl radicals. The cyclic hydrocarbyl radicals may further form other contiguous ring structures, including, but not limited to, indenyl, azulenyl and fluorenyl groups. These contiguous ring structures may further substituted or unsubstituted by hydrocarbyl radicals, such as $C_1$ to $C_{20}$ hydrocarbyl radicals.

Any desired polymerization process(es) may be carried out over the desired polymerization catalyst(s). The equipment, process conditions, reactants, additives and any other materials that may be used in the polymerization process(es) can vary depending on the desired composition and properties of the ICP being formed.

Polymer resins comprising an ICP may be formed by a sequential polymerization process. The polymerization reaction may be carried out in a plurality-reactor configuration, for example a two-reactor configuration. In a two-reactor configuration the catalyst, for example a Ziegler-Natta catalyst and propylene are charged into a first reactor. Within the reactor, the propylene homopolymer is produced on the surface of the catalyst particles. The propylene polymer-coated catalyst grains are then transferred to one or more secondary reactors, such as for example one or more gas-phase reactors, where the copolymer is produced by the copolymerization of the propylene and the ethylene in the presence of a catalyst. The copolymer, which has rubbery characteristics and provides impact resistance, may be incorporated within the matrix of the homopolymer component, which provides overall stiffness. Examples of suitable reactors include without limitation loop reactors, stirred tank reactors, gas-phase reactors and combinations thereof. Standard equipment and procedures for polymerizing propylene and another alpha olefin such as ethylene into an impact copolymer are known to one skilled in the art. Examples of catalysts suitable for preparation of the ICP are disclosed in U.S. Pat. Nos. 4,107,413; 4,294,721; 4,439,540; 4,114,319; 4,220,554; 4,460,701; 4,562,173; and 5,066,738, each of which is incorporated in its entirety by reference herein.

Gas phase polymerization processes useful with the present disclosure may include a continuous cycle system. A continuous cycle system may include a cycling gas stream, which may include a recycle stream or other fluidizing medium, which is heated in a reactor by the heat of polymerization. The heat is then removed from the cycling gas stream by a cooling system external to the reactor. The cycling gas stream containing one or more monomers may be continuously cycled through a fluidized bed in the presence of a catalyst under reactive conditions. The cycling gas stream may be withdrawn from the fluidized bed and recycled back into the reactor. A polymer product may be simultaneously withdrawn from the reactor while fresh monomer may be added to replace the polymerized monomer (polymer product). The gas phase process may be operated under reactor pressures ranging from 100 to 500 psig, from 200 to 400 psig, or from 250 to 350 psig. The gas phase process may be operated under reaction temperatures ranging from 30 to 120° C., from 60 to 115° C., from 70 to 110° C., or from 70 to 95° C.

Slurry phase processes may include forming a suspension of solid, particulate polymer in a liquid polymerization medium, and adding monomers, catalyst and optionally hydrogen to the medium. The suspension may be intermittently or continuously removed from the reactor. The removed suspension may then be subjected to separation step where the volatile components can be separated from the polymer and recycled to the reactor. The suspension may further include a diluent, such as a $C_3$ to $C_7$ alkane (e.g., hexane or isobutene), which is generally liquid under the conditions of polymerization and relatively inert. A bulk phase process is similar to that of a slurry process, except that in the bulk phase process the liquid medium is also the reactant (e.g., monomer). In an embodiment, the polymerization process may be a bulk process, a slurry process or a bulk slurry process.

In an embodiment, the slurry polymerization process may be carried out in a stirred reactor, such as a continuously stirred tank reactor (CSTR). Other types of polymerization processes may be used, such as stirred reactors in series, parallel or combinations thereof. Upon leaving the reactor, the polymer may be subjected to further processing, such as addition of additives and/or extrusion.

Nucleation of homophasic polymers may generally improve the optical properties, such as haze and clarity, of a polymer. However, nucleation of heterophasic polymers has not generally resulted in such improved optical properties.

The present disclosure, however, includes a polypropylene compatible nucleator. Polypropylene compatible nucleators may include a nucleator, or nucleating agent, capable of accelerating phase change in propylene based polymers.

The nucleated material may be obtained by the introduction of a nucleating agent into the ICP by any desired means. The nucleating agent may also be introduced at any point in the production of the ICP resin.

In an embodiment, the nucleating agent is combined with the ICP following polymerization. In an embodiment, the nucleating agent is combined with the ICP via melt mixing of the nucleating agent with the ICP in a molten, or liquid, state. In another embodiment, the nucleating agent is combined with the ICP via the use of a masterbatch, wherein the term "masterbatch" refers to the process of first melt mixing the nucleating agent with a small amount of PP resin, such as ICP resin, resulting in a masterbatch, followed by mixing the masterbatch with the remaining bulk of the ICP resin. In a further embodiment, the nucleating agent is combined with the ICP via physical blending of the nucleating agent with the ICP in a solid, or solid-like, state.

In an embodiment, the nucleation may be performed by the methods described in U.S. Pat. Nos. 6,599,971, 6,794,433, and 7,332,536, each to Dotson et al. and incorporated by reference herein in their entirety. In an embodiment, the nucleation may be performed by the methods described in U.S. Patent Application Nos. 20060047078 to Swabey et al. and 20080118749 and 20090029182, to Aubee et al., and incorporated by reference herein in their entirety.

The nucleating agents may include any additive that presents a new surface on which crystal growth can occur. The nucleating agents may be inorganic or organic. The inorganic nucleating agents may include small particulates such as talc and calcium carbonate. The nucleating agents may be selected from any polypropylene compatible nucleator known in the art. The polypropylene compatible nucleators may be selected from the group of carboxylic acid salts, such as sodium benzoate, talc, phosphates, metallic-silicate hydrates, organic derivatives of dibenzylidene sorbitol, sorbitol acetals, and organophosphate salts, and combinations thereof. In an embodiment, the nucleating agents include Na-11 (Sodium 2,2-methylene-bis-(4,6-di tert butylphenyl) phosphate) and Na-21 (primary component-Aluminum, hydroxybis[2,4,8,10-tetrakis(1,1-dimethylethyl)-6-hydroxy-12H-dibenzoi[d,g][1,3,2]dioxaphoshocin 6-oxidato]), both commercially available from Amfine Chemical. In an optional embodiment, the nucleating agents include Hyperform® HPN-68L (80% Bicyclo[2,2,1]Heptane-2,3-dicarboxylic acid, disodium salt+10% 13-Docosenamide (Z)+10% Amorphous Silicon Dioxide), HPN-20E (34% Zinc Stearate+66% 1,2-Cyclohexanedicarboxylic Acid, Calcium salt), Millad 3988 (3,4-dimethylebenzylidene sorbitol), and Millad 3940 ((1,3:2,4) Diparamethyldibenylidene sorbitol), each commercially available from Milliken and Company. In a specific embodiment, the nucleating agent includes Hyperform HPN-20E. In another embodiment, the nucleating agents include HHPA salts (salts of dicarboxylic acids having a hexahydrophtalic acid structure).

The nucleating agents may be present in any effective amounts. In an embodiment, the nucleating agents are present in the ICP in amounts of at least 1 ppm by weight ICP. In another embodiment, the nucleating agents are present in amounts ranging from 1 to 10,000 ppm by weight ICP, optionally from 50 to 5,000 ppm by weight ICP. In a further embodiment, the nucleating agents are present in amounts ranging from 50 to 3,000 ppm by weight ICP. In an even further embodiment, the nucleating agents are present in amounts ranging from 100 to 2,000 ppm by weight ICP, optionally from 500 to 1500 ppm by weight ICP.

In an embodiment, the polymeric composition may also contain additives as deemed necessary to impart desired physical properties, such as printability, increased gloss or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or the like with other components. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions are known to one skilled in the art.

The blends of the present disclosure have demonstrated improvements in bubble stability.

As used herein the term "low frost line height" refers to operating with a frost line height of less than 3 die diameters in height. This is sometimes referred to in the art as "running in the pocket" or running with "no neck".

In an embodiment, the polymers and blends thereof are used to form films. In another embodiment, the polymers and blends thereof are used to form blown films.

In an embodiment, the end-use article is a film, which may be further formed into a packaging container for a consumer product, such as for form fill and seal packaging. The films of this disclosure may be produced by any method and under any conditions known to one skilled in the art for the production of films. In an embodiment, the polymeric compositions are formed into films by the process of blown film extrusion.

Blown films are formed through a process whereby a polymeric composition is extruded through a conic spiral mandrel die to form a tube. The tube is then inflated into a balloon by the introduction of air via a hole in the center of the spiral mandrel die. A high-speed air ring mounted at the top of the die is used to cool the hot film. The balloon of film may continue to expand upward, with continuous cooling until it is flattened by passing through nip rolls.

Process parameters for blown film extrusion of the polymeric composition of this disclosure may include a blow up ratio of greater than 4, alternatively greater than 2.5 and, alternatively greater than 2 where the blow-up ratio refers to the ratio between the diameter of the inflated blown film to the die, in other words it is a measure of the extent of inflation of the film. Additional process parameters may include a draw down ratio of less than 15, alternatively less than 10 and, alternatively less than 7, where the draw down ratio refers to the relationship between the die gap and the film gauge. In an embodiment, the process parameters include a die temperature of greater than 440° F. and an extruder temperature of greater than 440° F. For example, a process for the production blown films uses the Alpine system available from Hosokawa. In an embodiment, production of blown films is carried out at generally the conditions given in Table 1.

TABLE 1

| Extruder diameter | 55 mm |
| --- | --- |
| Extruder speed | 75 rpm |
| Extruder temperature Profile | |
| Zone 1 | 170° F. |
| Zone 2 | 445° F. |
| Zone 3 | 445° F. |
| Melt temperature | 475° F. |
| Die temperature profile | |
| Die 1 | 445° F. |
| Die 2 | 445° F. |
| Die 3 | 445° F. |
| Die diameter | 118 mm |
| Die gap | 0.9 mm |
| Blow up ratio (BUR) | 2.5 |
| Neck height | 0 inch |

In an embodiment, the blown film may have a monolayer thickness from 0.5 mils to 3.5 mils. Such films may be used as a monolayer film product or may be co-extruded with other resins to form multilayer films. Films of this disclosure may display improvements in mechanical properties such as softness, optical properties such as reduced haze and an appearance having a reduced amount of wrinkles.

The disclosure will now be described further with respect to actual Examples that are intended simply to further illustrate the disclosure and not to limit it in any way.

EXAMPLES

Example 1

A ICP/nucleating agent composition was obtained through physically blending an ICP, Total 4170, commercially available from Total Petrochemicals USA, Inc., and Millad 3988, commercially available from Milliken and Company. In this experiment the nucleating agent was added utilizing a master batch using a PP carrier resin. The nucleated version of 4170 utilizing a master batch mixing process to achieve a final concentration of 2000 ppm Millad 3988. The results of this experiment show that the nucleated ICP had a dramatic reduction in the gauge standard deviation, in excess of 40%.

The processing data for these results are shown in Table 2 and FIG. 1.

TABLE 2

| | Processing Data | | |
| --- | --- | --- | --- |
| Material | Average Gauge (mil) | Standard Deviation | Relative Standard Deviation |
| 4170 Control | 1.96 | 0.099 | 5.0 |
| 4170 + 2000 ppm Millad 3988 | 1.99 | 0.055 | 2.7 |

Example 2

An ICP/nucleating agent composition was obtained through physically blending an ICP fluff, Total 4170, containing no nucleation agent, and Millad 3988, commercially available from Milliken and Company. In this experiment the nucleating agent was added during compounding. The results of this experiment show that the nucleated ICP had a dramatic reduction in the gauge standard deviation, in excess of 30%.

Figure 2:
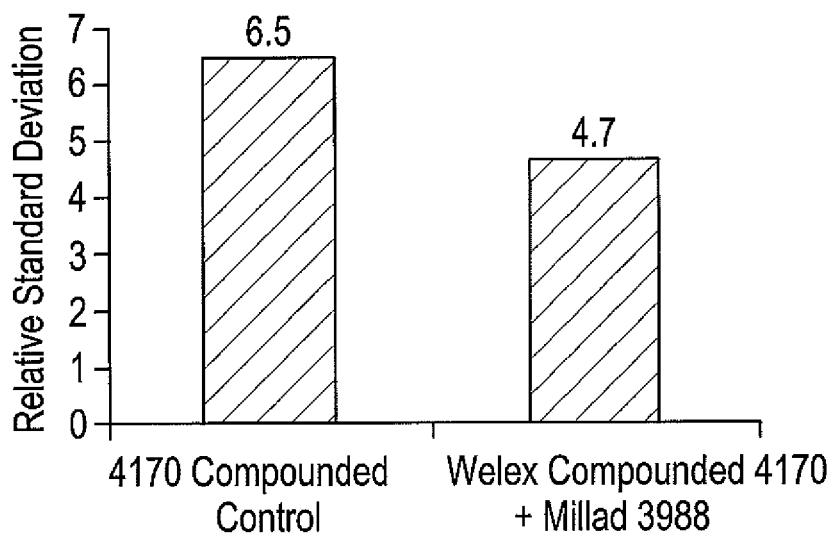
FIG. 2 is a graph of relative standard deviation of gauge thickness of blown films for various ICP formulations.

The processing data for these results are shown in Table 3 and FIG. 2.

TABLE 3

| | Processing Data | | |
| --- | --- | --- | --- |
| Material | Average Gauge (mil) | Standard Deviation | Relative Standard Deviation |
| 4170 Control | 1.90 | 0.123 | 6.5 |
| 4170 + 2000 ppm Millad 3988 | 1.68 | 0.079 | 4.7 |

Example 3

In this example a thinner film, 1 mil rather than 2 mil, was studied.

Figure 3:
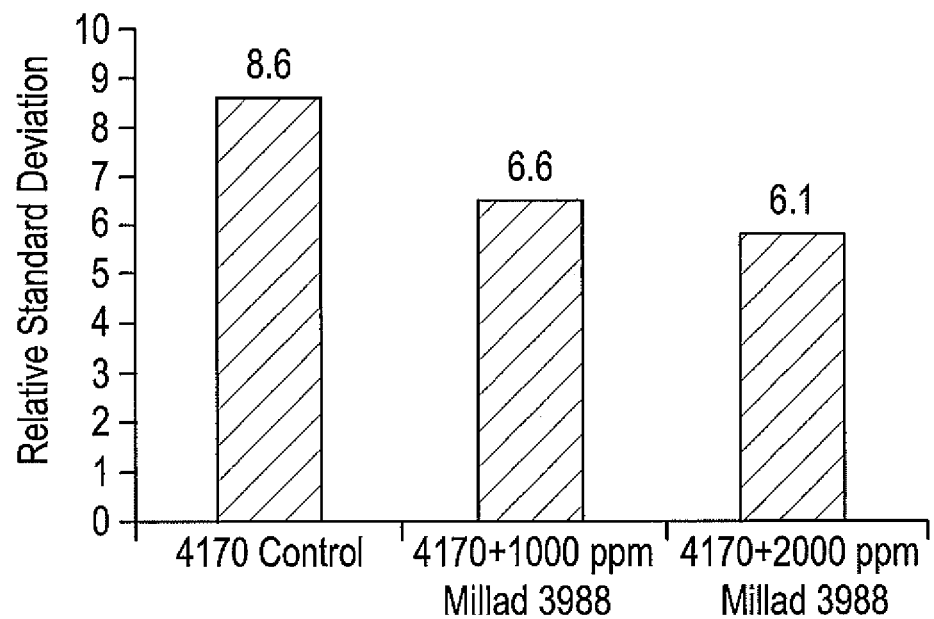
FIG. 3 is a graph of relative standard deviation of gauge thickness of blown films for various ICP formulations.

The effect of reducing the concentration of nucleating agent was evaluated through use of a Millad 3988 MB. In this case, Total 4170 with the original concentration (2000 ppm) and Total 4170 with a reduced concentration (1000 ppm) were compared to a control sample Total 4170 containing no nucleating agent. As shown in Table 4 and FIG. 3, the film gauge variation was reduced by ~25% with the lower concentration as compared to an improvement of ~30% for the higher concentration. Thus, both concentrations improved the bubble stability relative to neat 4170, but increasing the level of the additive provided only marginally better results.

TABLE 4

| 1 mil thickness film | |
| --- | --- |
| Material | Relative Standard Deviation |
| 4170 Control | 8.6 |
| 4170 + 1000 ppm Millad 3988 | 6.6 |
| 4170 + 2000 ppm Millad 3988 | 6.1 |

Example 4

The effect of various nucleators/clarifiers were studied.

Figure 4:
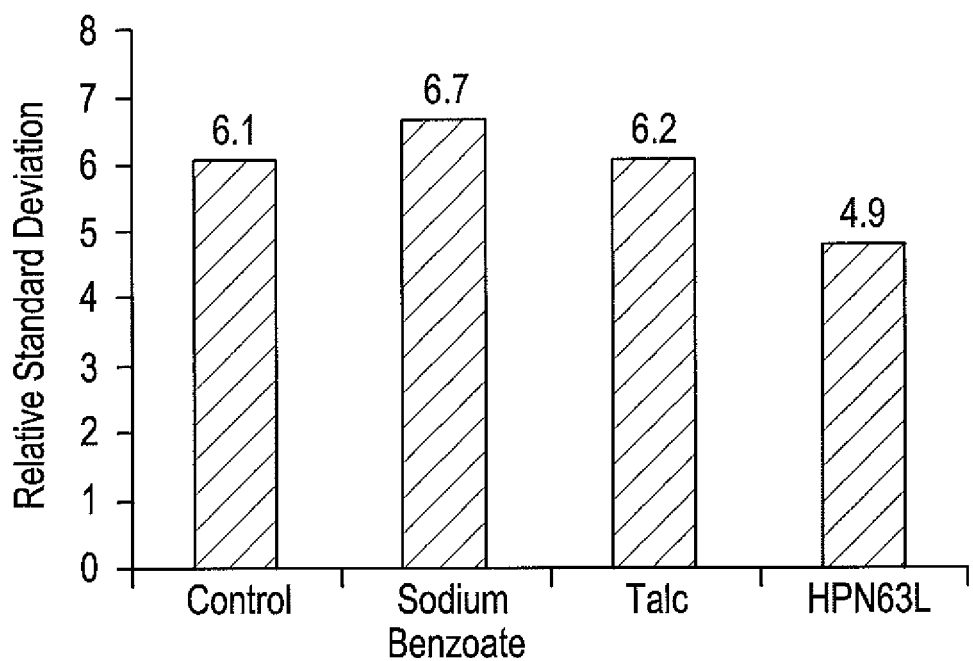
FIG. 4 is a graph of relative standard deviation of gauge thickness of blown films for various ICP formulations.

As shown in FIG. 4, neither talc nor sodium benzoate was effective in improving bubble stability as evidenced by the lack of improvement in gauge variation. The nucleator HPN-68L provided a reduction in gauge variation of ~20%, which, while less than the improvement achieved with Millad 3988 still indicates an improvement in bubble stability. Based on this data, it is likely that the effectiveness of an additive as a nucleator determines its effectiveness in improving bubble stability. Talc and sodium benzoate, for instance are relatively mild nucleators as compared to Milliken's HPN-68L and Millad 3988. This is confirmed by the DSC data which shows a significant shift in recrystallization temperature for the latter compounds as opposed to the former, as depicted in Table 4.

TABLE 4

|  | Recrystallization Peak (° C.) |
| --- | --- |
| 4170 Control | 117 |
| 4170 + Talc | 119 |
| 4170 + Sodium Benzoate | 122 |
| 4170 + HPN-68L | 135 |
| 4170 + Millad 3988 | 130 |

TABLE 5

| Material | Relative Standard Deviation |
| --- | --- |
| 4170 Control | 6.1 |
| 4170 + 2000 ppm Talc | 6.2 |
| 4170 + 2000 ppm Sodium Benzoate | 6.7 |
| 4170 + 2000 ppm HPN68L | 4.9 |

As used herein, the term "homopolymer" refers to a polymer resulting from polymerization of a single monomer species.

As used herein, the term "co-polymer," also known as a "heteropolymer," is a polymer resulting from polymerization of two or more monomer species.

As used herein, the term "nucleating agent" refers to an agent, or additive, that changes the crystallization behavior of a polymer as the polymer melt is cooled.

As used herein, the term "frost line height" refers to the distance from a die face to where solidification occurs, or the point beyond a die face where the temperature of the molten plastic falls below the softening point and the diameter of the extruded plastic bubble stabilizes.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The various embodiments of the present disclosure can be joined in combination with other embodiments of the disclosure and the listed embodiments herein are not meant to limit the disclosure. All combinations of embodiments of the disclosure are enabled, even if not given in a particular example herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While the foregoing is directed to embodiments, versions and examples of the present disclosure, which are included to enable a person of ordinary skill in the art to make and use the disclosures when the information in this patent is combined with available information and technology, the disclosure is not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the disclosure may be devised without departing from the basic scope thereof and the scope thereof is determined by the claims that follow.

What is claimed is:

1. A blown film composition comprising:
   an impact copolymer polypropylene component; and
   a polypropylene compatible nucleating agent, wherein the polypropylene compatible nucleating agent is selected from the group consisting of a phosphate, metallic-silicate hydrate, organic derivative of dibenzylidene sorbitol, sorbitol acetal, organophosphate salt, and combinations thereof;
   wherein the blown film composition has improved processing properties as compared to a blown film of the impact copolymer polypropylene component.

2. The composition of claim 1, wherein the improved processing properties includes improved bubble stability as compared to a blown film of the impact copolymer polypropylene component.

3. The composition of claim 1, wherein the improved processing properties includes a reduction in film gauge variation as compared to a blown film of the impact copolymer polypropylene component.

4. The composition of claim 3, wherein the reduction in film gauge variation is greater than 20% as compared to a blown film of the impact copolymer polypropylene component.

5. The composition of claim 3, wherein the reduction in film gauge variation is greater than 30% as compared to a blown film of the impact copolymer polypropylene component.

6. The composition of claim 3, wherein the reduction in film gauge variation is greater than 40% as compared to a blown film of the impact copolymer polypropylene component.

7. The composition of claim 1, wherein the improved processing properties includes increased throughput rate as compared to a blown film of the impact copolymer polypropylene component.

8. The composition of claim 1, wherein the polypropylene compatible nucleating agent is present in amounts ranging from 1 to 10,000 ppm.

9. The composition of claim 1, wherein the polypropylene compatible nucleating agent is present in amounts ranging from 50 to 5,000 ppm.

10. An article made from the blown film composition of claim 1.

11. A blown film composition comprising:
an impact copolymer polypropylene component; and
a polypropylene compatible nucleating agent, wherein the polypropylene compatible nucleating agent is selected from the group consisting of a phosphate, metallic-silicate hydrate, organic derivative of dibenzylidene sorbitol, sorbitol acetal, organophosphate salt, and combinations thereof;
wherein the blown film composition has improved processing properties as compared to a blown film of the impact copolymer polypropylene component;
wherein the polypropylene compatible nucleating agent content ranges from 1 ppm to 10,000 ppm;
wherein the blown film composition has a reduction in film gauge variation of greater than 20% as compared to a blown film of the impact copolymer polypropylene component without a polypropylene compatible nucleating agent.

12. The composition of claim 11, wherein the reduction in film gauge variation is greater than 30% as compared to a blown film of the impact copolymer polypropylene component.

13. The composition of claim 11, wherein the reduction in film gauge variation is greater than 40% as compared to a blown film of the impact copolymer polypropylene component.

14. An article made from the composition of claim 11.

15. The composition of claim 11, wherein the polypropylene compatible nucleating agent is present in amounts ranging from 50 to 5,000 ppm.

16. The composition of claim 11, wherein the polypropylene compatible nucleating agent is present in amounts ranging from 50 to 5,000 ppm.

17. A method of making a blown film composition comprising:
combining an impact copolymer polypropylene resin and a compatible nucleating agent, to form a nucleated impact copolymer resin.

18. The method of claim 17, wherein a blown film of the nucleated impact copolymer resin has a reduction in film gauge variation of greater than 20% as compared to a blown film of the impact copolymer polypropylene component without a compatible nucleating agent.

19. The method of claim 17, wherein the compatible nucleating agent content ranges from 1 ppm to 10,000 ppm.

20. The method of claim 17, wherein the compatible nucleating agent content ranges from 50 to 5,000 ppm.

21. The composition of claim 1, wherein the impact copolymer polypropylene component has a polypropylene homopolymer phase and an ethylene/propylene rubber phase.

22. The composition of claim 21, wherein the impact copolymer polypropylene component has an ethylene content ranging from 10 to 20 wt. %.

23. The composition of claim 1, wherein the impact copolymer polypropylene component has an ethylene content ranging from 7 to 15 wt. %.

24. The composition of claim 1, wherein the impact copolymer polypropylene component exhibits a melt flow rate of less than 4.0 g/10 min.

25. The composition of claim 1, wherein the impact copolymer polypropylene component exhibits a xylene solubles ranging from 10 to 25%.

* * * * *